(12) United States Patent
Park et al.

(10) Patent No.: US 12,712,243 B2
(45) Date of Patent: Aug. 18, 2026

(54) ELECTRODE ASSEMBLY FOR SECONDARY BATTERY INCLUDING SEPARATOR WITH NOTCH GROOVE AND SECONDARY BATTERY COMPRISING THE SAME

(71) Applicant: LG Energy Solution, Ltd., Seoul (KR)

(72) Inventors: Kyutae Park, Daejeon (KR); Sang Seung Oh, Daejeon (KR); Hyehyeon Kim, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 673 days.

(21) Appl. No.: 17/928,439

(22) PCT Filed: Mar. 30, 2022

(86) PCT No.: PCT/KR2022/004501
§ 371 (c)(1),
(2) Date: Nov. 29, 2022

(87) PCT Pub. No.: WO2022/250271
PCT Pub. Date: Dec. 1, 2022

(65) Prior Publication Data

US 2024/0213624 A1 Jun. 27, 2024

(30) Foreign Application Priority Data

May 26, 2021 (KR) ........................ 10-2021-0067468

(51) Int. Cl.
*H01M 50/463* (2021.01)

(52) U.S. Cl.
CPC ................................. *H01M 50/463* (2021.01)

(58) Field of Classification Search
CPC .......................... H01M 50/463; H01M 50/406
See application file for complete search history.

(56) References Cited

U.S. PATENT DOCUMENTS

2009/0136834 A1* 5/2009 Coowar ............ H01M 10/0583 29/623.2
2011/0064991 A1* 3/2011 Ahn .................. H01M 10/0436 429/176

(Continued)

FOREIGN PATENT DOCUMENTS

JP 2008091099 A 4/2008
JP 2010-086731 A 4/2010

(Continued)

OTHER PUBLICATIONS

Machine Translation of JP-2016015212-A (Year: 2016).*

(Continued)

*Primary Examiner* — Marla D Mcconnell
*Assistant Examiner* — Olivia A Jones
(74) *Attorney, Agent, or Firm* — Lerner David LLP

(57) ABSTRACT

According to embodiments of the present disclosure, there is provided an electrode assembly for secondary battery comprising:

a stacked body that includes a positive electrode, a negative electrode, and a separator interposed between the positive electrode and the negative electrode, with the separator being located at the outermost surface on both sides; and at least two pairs of fixing members attached in the stacking direction for fixing between the separators located at the outermost surface on both sides of the stacked body, wherein the separator includes at least one pair of notch grooves, and wherein the pair of notch grooves are formed one by one on one surface perpendicular to a protruding direction of an electrode tab and the other surface located in a diagonal direction thereof.

9 Claims, 7 Drawing Sheets

(56) References Cited

U.S. PATENT DOCUMENTS

2012/0225345 A1* 9/2012 Kim .................... H01M 50/42 429/144
2013/0130088 A1 5/2013 Hashizaki
2015/0069109 A1 3/2015 Mori et al.
2016/0104872 A1 4/2016 Shiraishi
2016/0218395 A1 7/2016 Ko et al.
2016/0268557 A1 9/2016 Sohn et al.
2017/0018753 A1 1/2017 Minagata et al.
2017/0092923 A1* 3/2017 Pasma ................ H01M 50/138
2018/0233771 A1 8/2018 Miyazaki et al.
2024/0213624 A1 6/2024 Park et al.

FOREIGN PATENT DOCUMENTS

JP 2012059363 A 3/2012
JP 2015176664 A 10/2015
JP 2015534251 A 11/2015
JP 2016015212 A * 1/2016
JP 2018037225 A 3/2018
JP 6775154 B2 10/2020
JP 2023531360 A 7/2023
KR 100529097 B1 11/2005
KR 101440008 B1 9/2014
KR 101636449 B1 7/2016
KR 20160109947 A 9/2016
KR 20160120575 A 10/2016
KR 20170103485 A * 9/2017 ........ H01M 10/0436
WO WO-2013180449 A1 * 12/2013 .......... H01M 50/466

OTHER PUBLICATIONS

Machine Translation of KR-20170103485-A (Year: 2017).*
Machine Translation of WO-2013180449-A1 (Year: 2013).*
Extended European Search Report including Written Opinion for Application No. 22809632.7 dated Jun. 21, 24. 6 pgs.
International Search Report for PCT/KR2022/004501 mailed Jun. 29, 2022.

* cited by examiner

【FIG. 1】
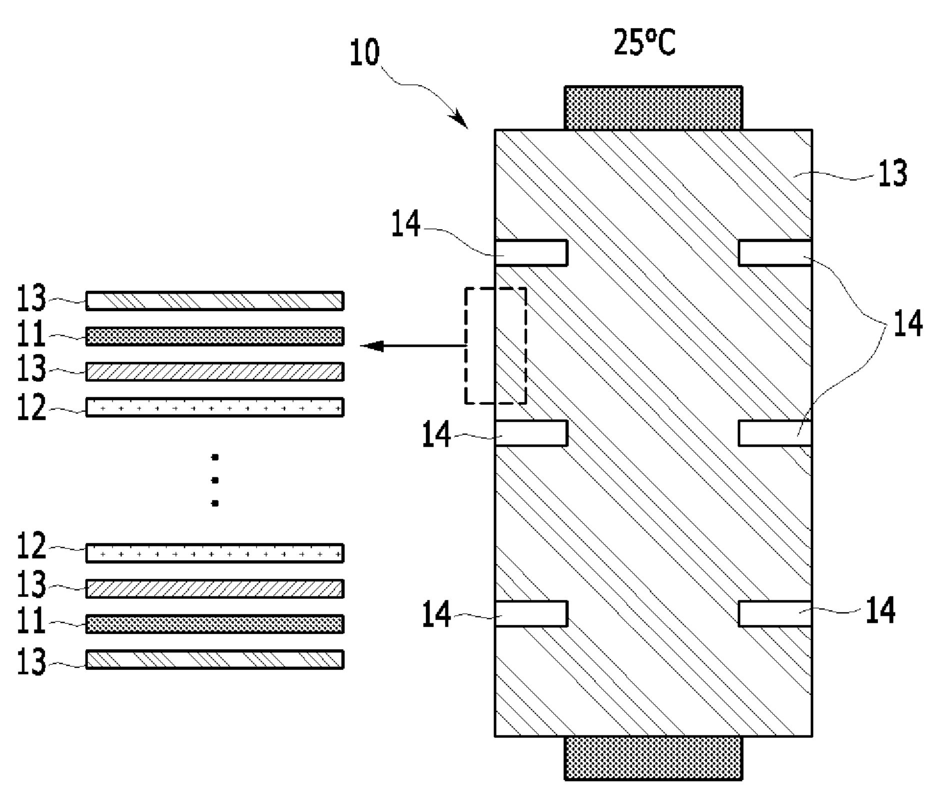

【FIG. 2】
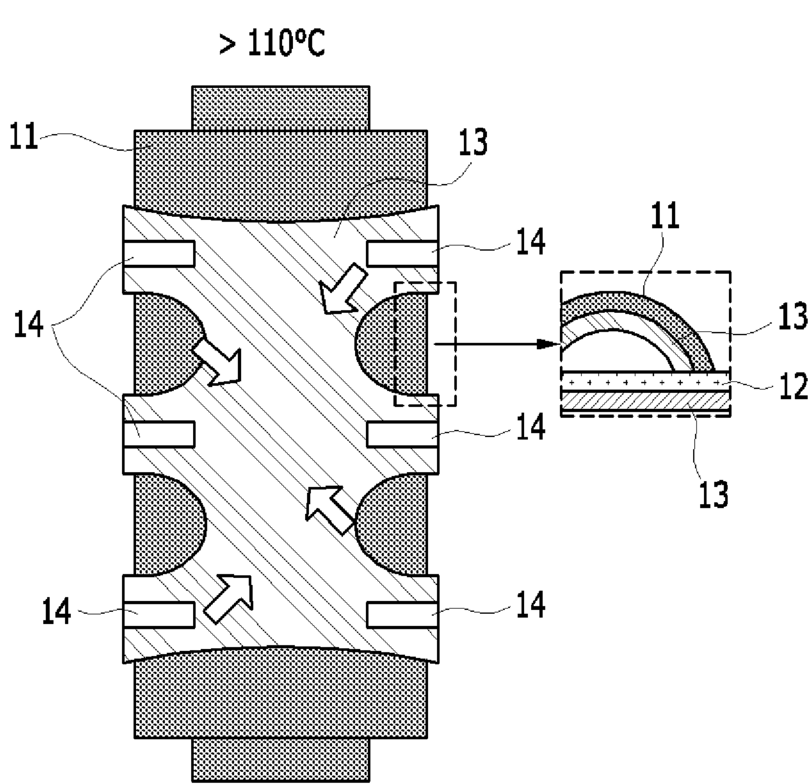

【FIG. 3】
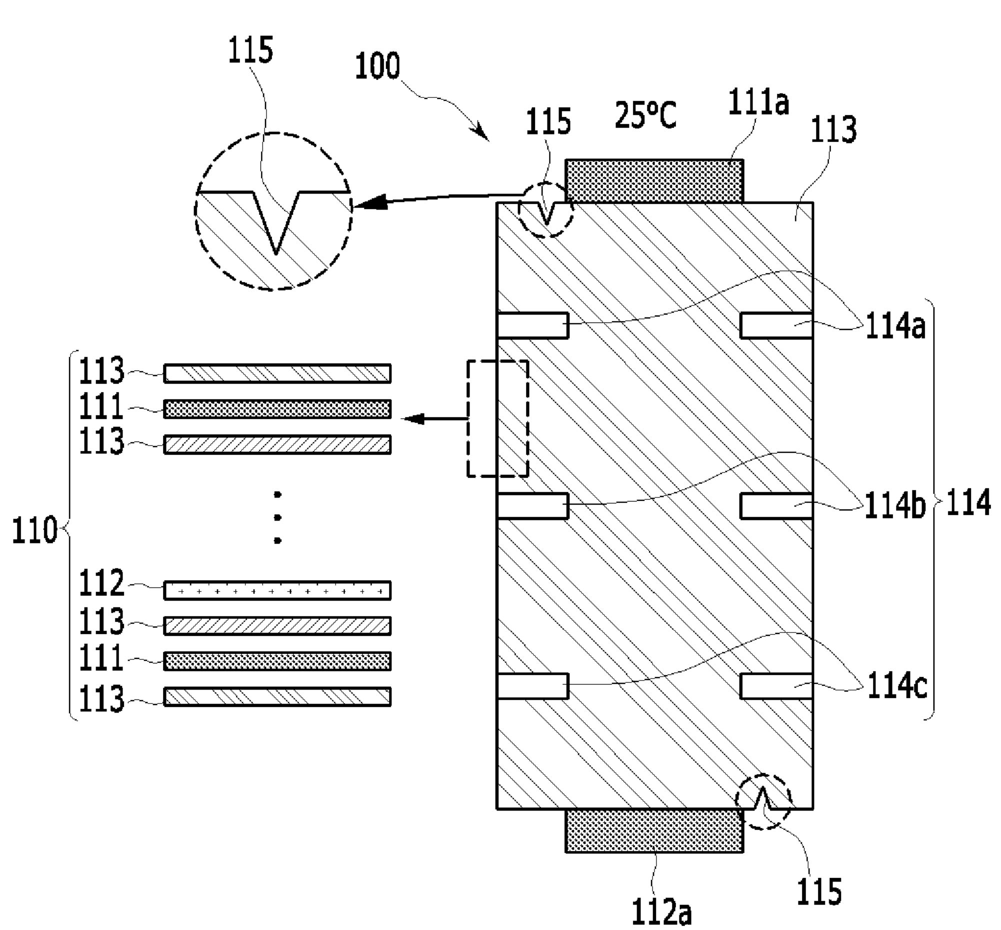

【FIG. 4】
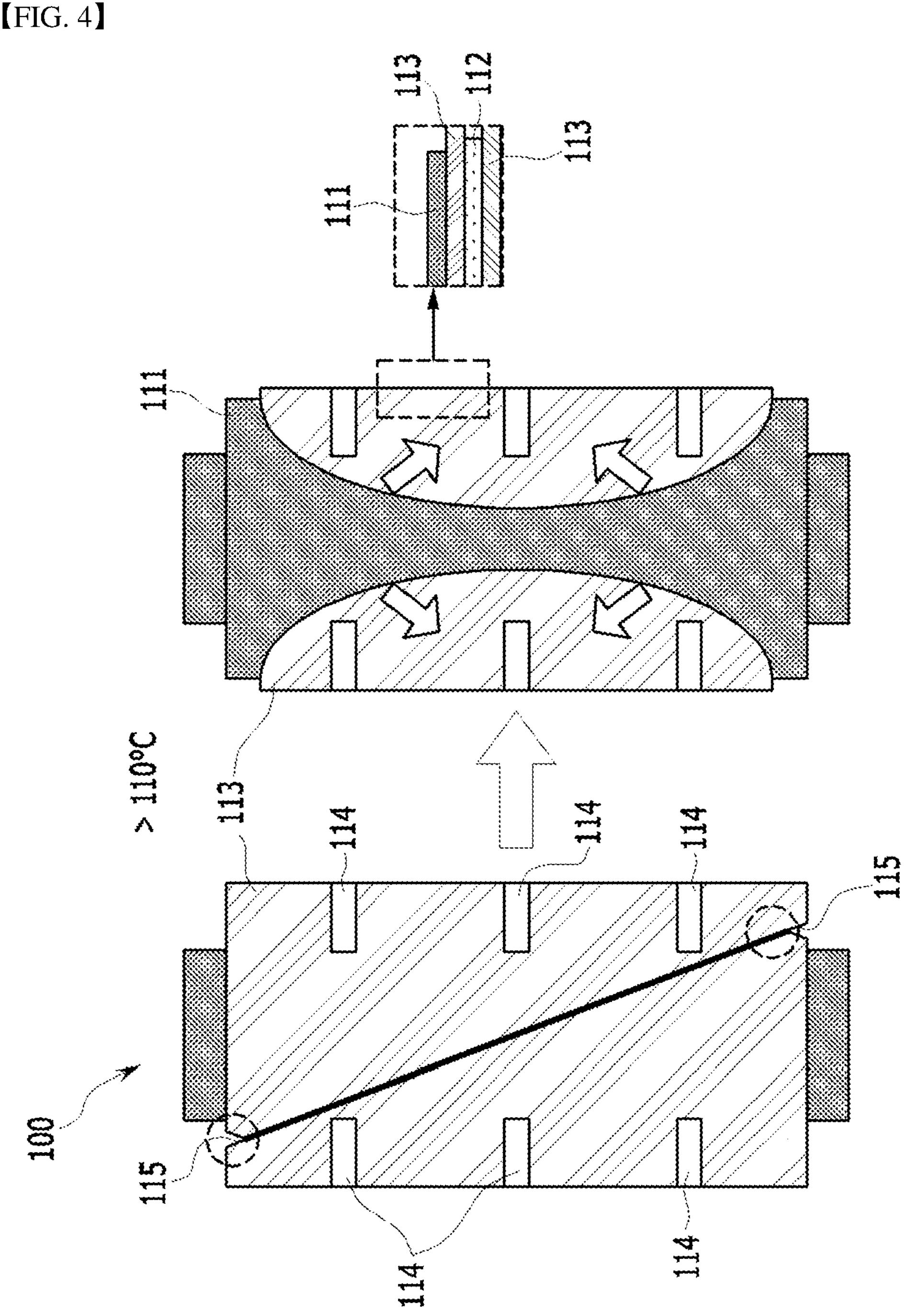

【FIG. 5】
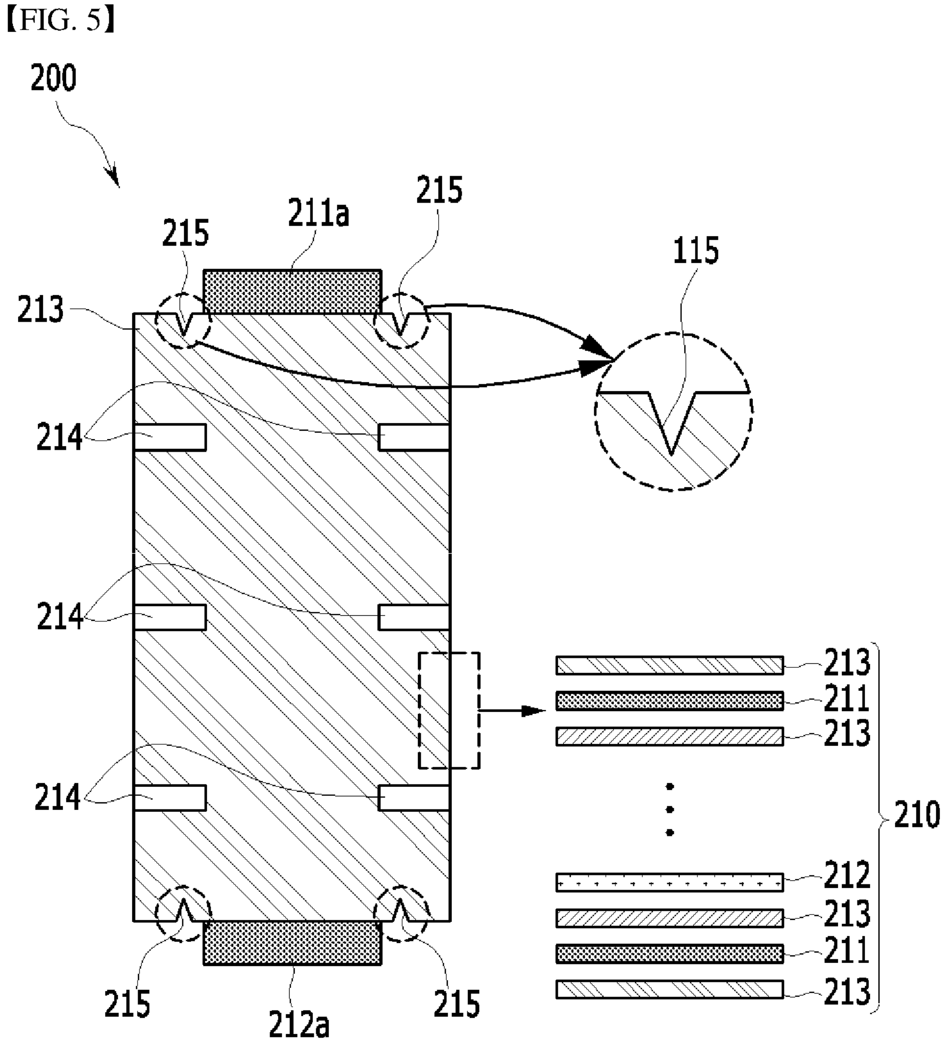

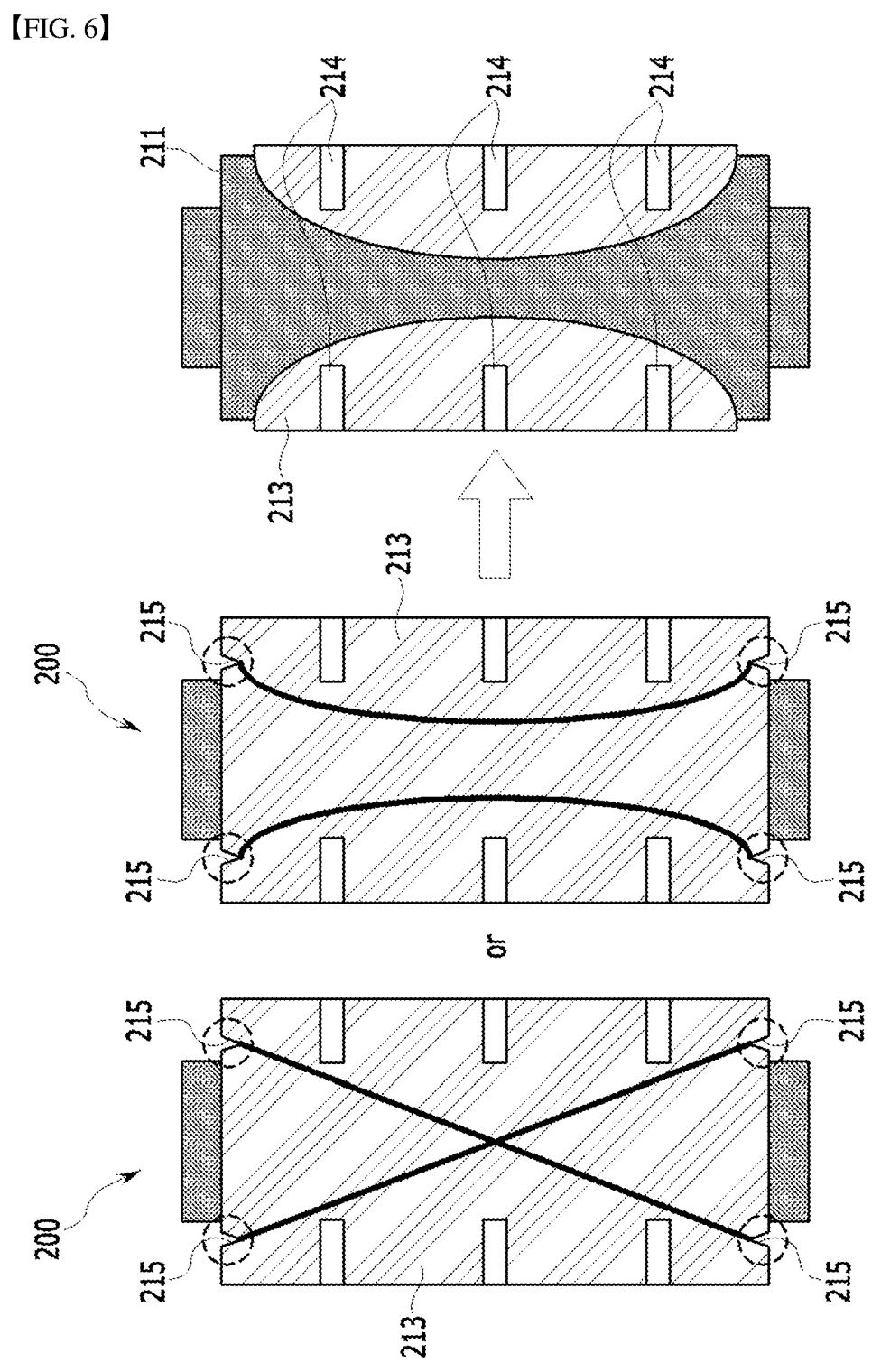

【FIG. 7】
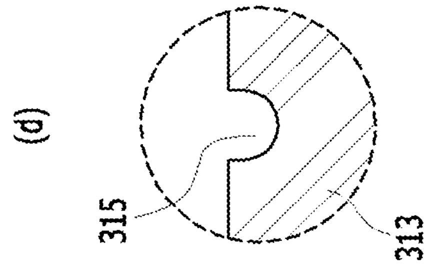
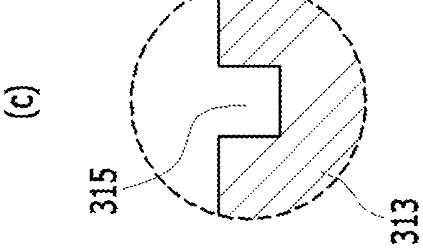
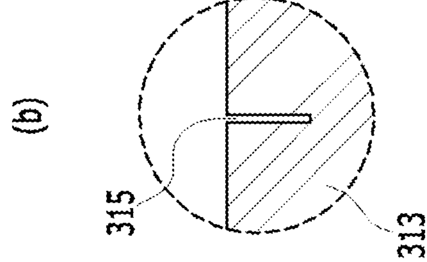
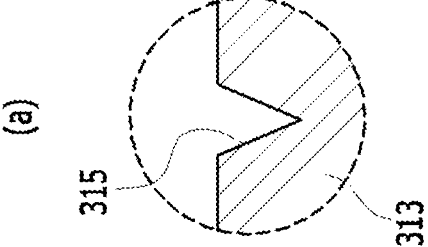

ELECTRODE ASSEMBLY FOR SECONDARY BATTERY INCLUDING SEPARATOR WITH NOTCH GROOVE AND SECONDARY BATTERY COMPRISING THE SAME

CROSS-REFERENCE TO RELATED APPLICATIONS

This application is a national stage entry under 35 U.S.C. § 371 of International Application No. PCT/KR2022/004501, filed on Mar. 30, 2022, which claims priority to Korean Patent Application No. 10-2021-0067468 filed on May 26, 2021, the disclosures of which are hereby incorporated herein by reference in their entireties.

TECHNICAL FIELD

The present disclosure relates to an electrode assembly for secondary battery including a separator with a notch groove formed therein and a secondary battery including the same

BACKGROUND

Due to the rapid increase in the use of fossil fuels, the demand for the use of alternative energy or clean energy is increasing, and as part thereof, the fields that are being studied most actively are the fields of power generation and power storage using electrochemistry.

At present, a secondary battery is a representative example of an electrochemical device that utilizes such electrochemical energy, and the range of use thereof tends to be gradually expanding.

In recent years, as mobile devices, such as portable computers, portable phones, and cameras, have been increasingly developed, the demand for secondary batteries has also sharply increased as an energy source for the mobile devices. Among such secondary batteries is a lithium secondary battery exhibiting high charge/discharge characteristics and lifetime characteristics and being environmentally friendly, in which much research has been carried out and which is now commercialized and widely used.

Generally, the secondary battery has a structure in which a non-aqueous electrolyte is impregnated into electrode assembly comprising a positive electrode, a negative electrode, and a porous separator.

At this time, the electrodes such as the positive electrode and the negative electrode must be completely separated, but there is a problem that they contact each other and a short circuit occurs due to contraction of the separator, protrusion of the electrode active material, and the like.

Generally, when a positive electrode active material and a negative electrode active material are short-circuited, the cell voltage drops along with small heat and the reaction is terminated. In case of a hard short circuit in which the positive electrode foil and the negative electrode active material are directly short-circuited, heat generation in mechanical, electrical or thermal abuse conditions leads to a thermal runaway, which greatly threatens safety.

In particular, such a hard short circuit occurs in the order of short circuit between electrodes, ignition and the like while deformation of the separator and the electrode occurs mainly due to the contraction of the separator occurring at a high temperature.

FIG. 1 schematically shows a conventional electrode assembly, and FIG. 2 schematically shows a phenomenon in which the electrode assembly is deformed at a high temperature to occur a hard short circuit.

Referring to FIGS. 1 and 2, a stacked body 10 includes a positive electrode 11, a negative electrode 12, and a separator 13 interposed between the positive electrode 11 and the negative electrode 12, with the separator 13 being also located at the outermost surface on both sides, and the stacked body is fixed by at least three pairs of fixing members 14 attached in the stacking direction for fixing between the separators 13 located at the outermost surface on both sides of the stacked body 10.

When such a stacked body 10 is subsequently used after being manufactured as a secondary battery, contraction of the separator 13 occurs at a high temperature. Specifically, as the temperature increases, the contraction of the separator 13 is accelerated, and there is a predetermined difference depending on the material. However, the contraction in the MD/TD direction at 150° C. is about 10% to 20%, and the contraction in the MD/TD direction at 180° C. exceeds 40%, respectively. At this time, the contraction of the separator 13 occurs in a narrow space between the fixing members 14, whereby the positive electrode 11 is deformed together in the stacking direction as in A, and a hard short circuit between the positive electrode 11 and the negative electrode 12 occurs, which leads to ignition.

Therefore, there is an urgent need to develop a technology that can solve such problems and delay or prevent hard short circuits between electrodes due to contraction of the separator at high temperatures and thus enhance safety at high temperature.

DETAILED DESCRIPTION OF THE INVENTION

Technical Problem

The present disclosure has been made to solve the above-mentioned problems and other technical problems that have yet to be resolved.

Specifically, an object of the present disclosure is to provide an electrode assembly for secondary battery that can prevent hard short circuits between electrodes and improve high temperature safety by forming a notch groove in the separator of the stacked body and thus inducing a high-temperature contraction direction and path, and a secondary battery including the same.

Technical Solution

According to one aspect of the present disclosure, there is provided an electrode assembly for secondary battery comprising:

- a stacked body that includes a positive electrode, a negative electrode, and a separator interposed between the positive electrode and the negative electrode, with the separator being located at the outermost surface on both sides; and
- at least two pairs of fixing members attached in the stacking direction for fixing between the separators located at the outermost surface on both sides of the stacked body,
- wherein the separator includes at least one pair of notch grooves, and
- wherein the pair of notch grooves are formed one by one on one surface perpendicular to a protruding direction of an electrode tab and the other surface located in a diagonal direction thereof.

At this time, the notch groove is formed in at least two pairs, and the notch grooves may be formed in a diagonal direction and a linear direction of each surface perpendicular to the protruding direction of the electrode tab.

Further, the notch groove may be formed at a position that does not interfere with the electrode tab.

A planar shape of the notch groove may be a slit-like shape, a polygonal shape, a circular shape, or an elliptical shape.

Meanwhile, the planar shape of the notch groove may be a slit-like shape or a triangular shape.

The fixing member may include polyimide.

The fixing member may be configured such that a pair of fixing members are attached at positions facing each other on both sides parallel to the protruding direction of the electrode tab, and the other at least one pair of fixing members are attached at a position facing each other on both sides parallel to the protruding direction of the electrode tab at a position spaced apart from the pair of fixing members.

Meanwhile, the electrode assembly may be a lamination and stack type electrode assembly or a stack and folding type electrode assembly.

According to another aspect of the present disclosure, there is provided a secondary battery in which the electrode assembly according to the present disclosure is built in a secondary battery case together with an electrolyte.

BRIEF DESCRIPTION OF THE DRAWINGS

FIG. 1 schematically shows a conventional electrode assembly;

FIG. 2 is a schematic view of a form in which a conventional electrode assembly for secondary battery is deformed at a high temperature so that the separator is contracted;

FIG. 3 is a schematic diagram of an electrode assembly for secondary battery according to an embodiment of the present disclosure;

FIG. 4 is a schematic view of a form in which the electrode assembly of FIG. 3 is deformed at a high temperature so that the separator is contracted;

FIG. 5 is a schematic diagram of an electrode assembly of a secondary battery according to another embodiment of the present disclosure;

FIG. 6 is a schematic view of a form in which the electrode assembly of FIG. 5 is deformed at a high temperature so that the separator is contracted; and FIG. 7 is a schematic view which shows the planar shape of the notch groove.

DETAILED DESCRIPTION OF THE EMBODIMENTS

Hereinafter, the present disclosure will be described in more detail for a better understanding of the present disclosure.

Terms or words used in the present specification and claims should not be construed as limited to ordinary or dictionary terms, and the present disclosure should be construed with meanings and concepts that are consistent with the technical idea of the present disclosure based on the principle that the inventors may appropriately define concepts of the terms to appropriately describe their own disclosure in the best way.

The technical terms provided herein is merely used for the purpose of describing particular embodiments only, and is not intended to be limiting of the present disclosure. The singular forms "a", "an", and "the" are intended to include the plural forms as well, unless the context clearly indicates otherwise.

It should be understood that the terms "comprise", "include", "have", etc. are used herein to specify the presence of stated features, integers, steps, components or combinations thereof, but do not preclude the presence or addition of one or more other features, integers, steps, components, or combinations thereof.

According to one embodiment of the present disclosure, there is provided an electrode assembly for secondary battery comprising:

- a stacked body that includes a positive electrode, a negative electrode, and a separator interposed between the positive electrode and the negative electrode, with the separator being located at the outermost surface on both sides; and
- at least two pairs of fixing members attached in the stacking direction for fixing between the separators located at the outermost surface on both sides of the stacked body,
- wherein the separator includes at least one pair of notch grooves, and
- wherein the pair of notch grooves are formed one by one on one surface perpendicular to a protruding direction of an electrode tab and the other surface located in a diagonal direction thereof.

FIG. 3 schematically shows an electrode assembly 100 for secondary battery according to an embodiment of the present disclosure.

Referring to FIG. 3, the electrode assembly 100 according to the present disclosure includes a stacked body 110 that includes a positive electrode 111, a negative electrode 112, and a separator 113 interposed between the positive electrode 111 and the negative electrode 112, and present at the outermost surface on both sides; and at least three pairs of fixing members 114 attached in the stacking direction for fixing between the separators 113 located at the outermost surface on both sides of the stacked body 110.

The fixing member 114 is provided for fixing the stacked body 110, and may include at least two pairs of fixing members for firmly fixing the stacked body 110.

At this time, the fixing member 114 is configured such that a pair of fixing members 114*a* are attached at positions facing each other on both sides parallel to the protruding direction of the electrode tabs 111*a* and 112*a*, and the other at least one pair of fixing members 114*b* and 114*c* are attached at a position facing each other on both sides parallel to the protruding direction of the electrode tabs 111*a* and 112*a* at a position spaced apart from the pair of fixing members 114*a*.

As the material constituting such a fixing member 114, various materials used for the battery can be selected, but specifically, a material that has both heat resistance and insulating property and thus does not have a short circuit problem is preferable, and for example, it may include polyimide.

Further, according to the present disclosure, the separator 113 includes a pair of notch grooves 115 that are formed one by one on one surface perpendicular to the protruding direction of the electrode tabs 111*a* and 112*a* and the other surface located in a diagonal direction thereof, and the notch groove 115 may be formed at a position that does not interfere with the electrode tabs 111*a* and 112*a*, so as to prevent the electrode tab having a first polarity and the electrode active material layer having a second polarity from contacting with each other and causing a short circuit.

That is, for example, when the notch groove 115 is formed at a position where it overlaps with the electrode tabs 111*a* and 112*a*, there is a possibility that the positive electrode tab 111*a* and the negative electrode active material layer of the negative electrode 112 comes into contact with each other at the notch groove 115 portion to cause a short circuit. Therefore, in order to prevent these problems, the tabs 111*a* and 112*a* are formed at positions that do not interfere with each other.

Additionally, a pair of notch grooves 115 are specifically formed at horizontally and vertically symmetrical positions with respect to each other.

FIG. 4 schematically shows a phenomenon in which the separator contracts and deforms when the electrode assembly 100 is exposed to a high temperature.

Referring to FIG. 4, if a pair of notch grooves 115 are formed in the separator 113 as in the present disclosure, the separator contracts as well when the electrode assembly 100 is exposed to a high temperature. However, the pair of previously formed notch grooves 115 causes tearing of the separator in the form of connecting a pair of notch grooves 115, whereby contraction does not occur between the fixing members 114, and the positive electrode 111 and the separator 113 are not deformed in the stacking direction, thereby capable of preventing a hard short circuit, reducing the possibility of ignition and thus improving battery safety.

That is, the pair of notch grooves 115 causes tearing of the separator 113 while inducing a path in which the separator 113 is contracted, thereby preventing deformation of the positive electrode 111 or the negative electrode 112 in the stacking direction.

Meanwhile, a pair of notch grooves may be formed as shown in FIGS. 3 to 4, but at least two pairs may be formed.

FIG. 5 schematically shows an electrode assembly 200 in which two pairs of notch grooves are formed according to another embodiment of the present disclosure, and FIG. 6 schematically shows a phenomenon in which the separator contracts and deforms when the electrode assembly is exposed to a high temperature.

First, referring to FIG. 5, the electrode assembly 200 includes a stacked body 210, and three pairs of fixing members 214 attached in the stacking direction for fixing between the separators 213 located at the outermost surface on both sides of the stacked body 210, similarly to those shown in FIG. 3. However, the separator 213 includes two pairs of notch grooves 215 formed in a diagonal direction and a linear direction on each surface perpendicular to the protruding direction of the electrode tabs 211*a* and 212*a*, and the two pairs of notch grooves 215 are formed at positions that do not interfere with the electrode tabs 211*a* and 212*a*. Further, the two pairs of notch grooves 215 are specifically formed in horizontally and vertically symmetrical shapes with respect to each other.

Referring to FIG. 6, when the electrode assembly 200 in which the two pairs of notch grooves 215 are formed in this way is also exposed to a high temperature, the separator 213 is contracted, and the separator 213 is torn and contracted in a vertical direction or a diagonal direction by the two pairs of notch grooves 215. Therefore, similarly to the electrode assembly 100 in which a pair of notch grooves are formed, no contraction occurs between the fixing members 214, and thus, the positive electrode or the negative electrode and the separator 214 are not deformed in the stacking direction, thereby capable of preventing a hard short circuit, reducing the possibility of ignition and thus improving battery safety.

If at least two pairs of notch grooves are formed in this way, it is possible to more reliably induce the path of contraction and tearing of the separator.

Meanwhile, the planar shape of the notch grooves is not limited, and can be formed in various ways. For example, it may be a slit-like shape, a polygonal shape, a circular shape, or an elliptical shape.

FIG. 7 schematically shows the planar shape of the notch groove 315.

Referring to FIG. 7, the notch groove 315 forms the planar shape into a triangular shape, so that the contraction and tearing directions of the separator 313 can be induced in a diagonal direction (FIG. 7(*a*)), or it forms the planar shape into a slit-like shape, so that the contraction and tearing direction of the separator 113 can be induced in a direction in which a slit is formed, that is, in a linear direction (FIG. 7(*b*)), or it forms the planar shape into a square shape, so that the contraction and tearing direction of the separator 113 can be induced in a direction extending from the lower corners on both sides (FIG. 7(*c*)), or it forms the planar shape into a circular or elliptical shape (FIG. 7(*d*)), so that the contraction and tearing direction of the separator 313 can be induced in various directions.

However, specifically, the planar shape of the notch groove 315 may be a slit-like shape or a triangular shape so that the direction of contraction and tearing of the separator is constant and thus can minimize influence on the fixing member.

Further, the size of the notch groove is preferably formed into a size in which a short circuit between the positive electrode and the negative electrode does not occur due to the formation of the notch groove, that is, a size in which the positive electrode active material layer and the negative electrode active material layer are not exposed. Within this range, the size is not limited.

Meanwhile, the electrode assembly is not limited as long as it has a shape including a stacked body, and may be a stack type electrode assembly, a lamination and stack type electrode assembly, or a stack and folding type electrode assembly. Specifically, it may be a lamination and stack type electrode assembly or a stack and folding type electrode assembly.

Since the detailed manufacturing method and configuration of such an electrode assembly are known in the art, a detailed description thereof will be omitted herein.

Meanwhile, according to another embodiment of the present disclosure, there is provided a secondary battery in which the electrode assembly is built in a secondary battery case together with an electrolyte.

At this time, the electrolyte may be a lithium salt non-aqueous electrolyte, and the secondary battery may be a lithium secondary battery.

Since the above configuration is well known in the art, a detailed description thereof will be omitted herein.

Based on the above disclosure, various applications and modifications can be carried out by those of ordinary skill in the art without deviating from the spirit and scope of the present disclosure.

INDUSTRIAL APPLICABILITY

As described above, the electrode assembly for secondary battery according to an embodiment of the present disclosure forms a notch groove in the separator and gives an artificial defect to the separator, which thus induces the contraction direction and path during contraction of the separator at a high temperature, thereby exhibiting the effects of delaying and preventing hard short circuits between electrodes that may occur at high temperature, and thus, preventing ignition at high temperatures and enhancing the safety of secondary batteries.

The invention claimed is:

1. An electrode assembly for a secondary battery, the electrode assembly comprising:

a stacked body that includes a first outermost surface, a second outermost surface opposite the first outermost surface, a positive electrode, a negative electrode, and a plurality of separators stacked with one another, the plurality of separators including first and second separators located at the first and second outermost surfaces, respectively;

wherein each of the first and second separators comprise a first longitudinal side and a second longitudinal side;

and at least two pairs of fixing members extending in a stacking direction between the first and second separators and located at the first longitudinal side and the second longitudinal sides of the first and second separators, wherein each of the first and second separators includes at least one pair of notch grooves, wherein a first groove of a first pair of notch grooves of the first separator extends into a first lateral edge of the first separator, the first lateral edge of the first separator is perpendicular to the first longitudinal side of the first separator; and a first groove of a first pair of notch grooves of the second separator extends into a first lateral edge of the second separator, the first lateral edge of the second separator is perpendicular to the first longitudinal side of the second separator; and a second groove of the first pair of notch grooves of the first separator extends into a second lateral edge of the first separator, the second lateral edge of the first separator is opposite to the first lateral edge of the first separator and perpendicular to the second longitudinal side of the first separator; and a second groove of the first pair of notch grooves of the second separator extends into a second lateral edge of the second separator, the second lateral edge of the second separator is opposite to the first lateral edge of the second separator and perpendicular to the second longitudinal side of the second separator;

and wherein a first electrode tab protrudes along a first lateral edge of the stacked body and a second electrode tab protrudes along a second lateral edge of the stacked body, and wherein, in the stacking direction, the first groove of the first pair of notch grooves of the first separator is located between the first electrode tab and a corner of the first separator formed from the first longitudinal side of the first separator and the first lateral edge of the first separator; and in the stacking direction, the first groove of the first pair of notch grooves of the second separator is located between the first electrode tab and a corner of the second separator formed from the first longitudinal side of the second separator and the first lateral edge of the second separator; and in the stacking direction, the second groove of the first pair of notch grooves of the first separator is located between the second electrode tab and a corner of the first separator formed from the second longitudinal side of the first separator and the second lateral edge of the first separator; and in the stacking direction, the second groove of the first pair of notch grooves of the second separator is located between the second electrode tab and a corner of the second separator formed from the second longitudinal side of the second separator and the second lateral edge of the second separator; and wherein the first and second separators are configured such that when the first and second separators are contracted, tearing of the first and second separators occurs while inducing a path in which the first and second separators are contracted by the at least one pair of notch grooves.

2. The electrode assembly according to claim 1, wherein the at least one pair of notch grooves is at least two pairs of notch grooves, wherein a first groove of a second pair of notch grooves of the first separator extends into the first lateral edge of the first separator; a first groove of a second pair of notch grooves of the second separator extends into the first lateral edge of the second separator; and wherein a second groove of the second pair of notch grooves of the first separator extends into the second lateral edge of the first separator; and a second groove of the second pair of notch grooves of the second separator extends into the second lateral edge of the second separator; and wherein, in the stacking direction, the first groove of the second pair of notch grooves of the first separator is located between the first electrode tab and a corner of the first separator formed from the second longitudinal side of the first separator and the first lateral edge of the first separator; and wherein, in the stacking direction, the first groove of the second pair of notch grooves of the second separator is located between the first electrode tab and a corner of the second separator formed from the second longitudinal side of the second separator and the first lateral edge of the second separator; and wherein, in the stacking direction, the second groove of the second pair of notch grooves of the first separator is located between second electrode tab and a corner of the first separator formed from the second lateral edge of the first separator and the first longitudinal side of the first separator; and wherein, in the stacking direction, the second groove of the second pair of notch grooves of the second separator is located between second electrode tab and a corner of the second separator formed from the second lateral edge of the second separator and the first longitudinal side of the second separator.

3. The electrode assembly according to claim 1, wherein each notch groove is formed at a position that does not overlap the first electrode tab or the second electrode tab.

4. The electrode assembly according to claim 1, wherein a planar shape of each notch groove is a slit-like shape, a polygonal shape, a circular shape, or an elliptical shape.

5. The electrode assembly according to claim 4, wherein the planar shape of each notch groove is a slit-like shape or a triangular shape.

6. The electrode assembly according to claim 1, wherein each fixing member includes polyimide.

7. The electrode assembly according to claim 1, wherein a first pair of the at least two pairs of fixing members are disposed at positions of the first and second longitudinal sides of the first and second separators, and a second pair of the at least two pairs of fixing members are disposed at positions of the first and second longitudinal sides of the first and second separators, the first pair of fixing members being spaced apart from the second pair of fixing members.

8. The electrode assembly according to claim 1, wherein the electrode assembly is a lamination and stack type electrode assembly or a stack and folding type electrode assembly.

9. The secondary battery comprising the electrode assembly according to claim 1 disposed in a secondary battery case together with an electrolyte.

* * * * *